(12) United States Patent  
Wagner

(10) Patent No.: US 6,921,123 B2  
(45) Date of Patent: Jul. 26, 2005

(54) ENCLOSED MOTOR VEHICLE IN PARTICULAR A VAN, A STATION WAGON, OR AN SUV

(75) Inventor: Tobias Wagner, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/751,211

(22) Filed: Jan. 2, 2004

(65) Prior Publication Data

US 2004/0140689 A1 Jul. 22, 2004

(30) Foreign Application Priority Data

Jan. 20, 2003 (DE) .......................................... 103 02 237

(51) Int. Cl.[7] .................................................. B60J 7/02
(52) U.S. Cl. ........................... 296/107.17; 296/100.08; 296/216.01; 296/220.01
(58) Field of Search ....................... 296/193.12, 100.06, 296/100.07, 100.08, 100.1, 107.17, 216.01, 216.02, 220.01

(56) References Cited

U.S. PATENT DOCUMENTS 4,184,709 A * 1/1980 Kim ........................... 296/219
6,299,243 B1 * 10/2001 Gerald, Sr. .................. 296/210
6,460,921 B2 * 10/2002 DeGaillard ................. 296/218

FOREIGN PATENT DOCUMENTS

| DE | 34 20 349 | 12/1985 |
| DE | 196 31 213 | 12/1997 |
| DE | 199 43 716 | 9/2002 |
| EP | 0 850 792 | 2/2002 |

* cited by examiner

Primary Examiner—Joseph D. Pape  
(74) Attorney, Agent, or Firm—Klaus J. Bach

(57) ABSTRACT

In a motor vehicle with an upright rear end, such as a station wagon, a van or an SUV, having a rear loading space with a roof extending over the rear loading space to the upright rear end of the vehicle and a loading opening at the rear end extending from the vehicle floor up to the vehicle roof, the roof includes a rear roof part with a pivotal support at the front end thereof so that it can be tilted upwardly to facilitate access to the loading space and a drive mechanism is provided for operating the rear roof part including a releasable coupling permitting uncoupling of the rear roof part from the pivotal support for transferring the rear roof part into an upright position in the interior of the vehicle.

19 Claims, 8 Drawing Sheets

ENCLOSED MOTOR VEHICLE IN PARTICULAR A VAN, A STATION WAGON, OR AN SUV

BACKGROUND OF THE INVENTION

The invention relates to an enclosed motor vehicle in particular a van, a station wagon, or SUV with a roof, which extends to the rear end of the vehicle with an upright loading opening and a roof area at the rear end of the vehicle in the form of a lid which can be pivoted upwardly with respect to the plane of the roof about a transverse pivot axis.

An enclosed vehicle of this type on the basis of a passenger car in the form of a small delivery van is known which has a roof which extends up to the rear end of the vehicle and which has a rear loading opening which extends into the roof. The cover for the loading opening comprises two parts. The lower vertical part is formed by a door, which is hinged at one side. The upper part comprises a section of the roof which is supported pivotally about a transverse axis so that it can be pivoted upwardly to an open position in which access to the loading area is improved over the full height of the opening.

Such an arrangement of a closed vehicle improves the access to the loading area and is therefore advantageous under certain circumstances, but it does not provide for a substantially increased utilization of the loading area.

DE 34 20 349 A1 discloses a station wagon wherein a rear roof section is movable forwardly or can be removed altogether in order to open a rear roof section. A rear flap door is pivotally supported at the top rear end of the vehicle body by way of two arms. The arms also serve as side frame members for the rear window which can be lowered so that, with the roof section moved forwardly or removed, a large, loading opening is provided for the transport of bulky goods.

EP 0 850 792 B1 discloses an enclosed vehicle with a roof area formed by several roof parts which, for the transfer to an upright storage position within the vehicle, are first all tilted upwardly into a vertical position and are then combined as a packet lowered by means of a carrier of a guide mechanism into the vehicle interior.

DE 196 31 213 C1 discloses a vehicle with a stationary rear roof part and a slidably and pivotally supported front roof part which is movable to the rear over the rear roof part. A rear end lid of the vehicle body is pivotally supported by pivot arms so that it can be pivoted upwardly over the rearwardly moved front roof part. Then, the stationary rear roof part, the front roof part and the rear end lid are disposed on top of one another oriented in the plane of the roof.

DE 199 43 716 C2 finally discloses a passenger car with an essentially vertical back-end including rear end and rear roof cover areas which can be opened and which, in the closed position abut each other so as to form an enclosed interior space. The rear roof cover is supported so as to be pivotable about the front edge thereof into a vertical open position within the vehicle interior. The rear end cover is a door including a window in the upper part thereof. For opening, the window can be lowered into the lower part of the door. When closed, the window engages directly the rear roof part. Therefore, with the window and also the rear roof part open, the interior vehicle space is open toward the rear and the top and a vehicle configuration similar to a pickup vehicle is generated.

It is the object of the present invention to provide a closed vehicle with increased utilization capabilities, that is, a vehicle, which can serve as a passenger car, as a van or a combination with a high experience value for the occupants.

SUMMARY OF THE INVENTION

In a motor vehicle with an upright rear end such as a station wagon, a van or an SUV, having a rear loading space with a roof extending over the rear loading space to the upright rear end of the vehicle and a loading opening at the rear end extending from the vehicle floor up to the vehicle roof, the roof includes a rear roof part with a pivotal support at the front end thereof so that it can be tilted upwardly about a stationary pivot axis to facilitate access to the loading space and a drive mechanism is provided for operating the rear roof part including releasable coupling means permitting uncoupling of the rear roof part from the pivotal support for transferring the rear roof part into an upright position in the interior of the vehicle.

Expediently, the stationary pivot axis of the rear roof part is arranged in the front area of the rear roof part. Preferably, the rear roof part pivot shaft as well as its operating mechanism is arranged symmetrically with the opposite longitudinal side walls of the vehicle.

The rear roof part is expediently connected to the stationary pivot shaft by way of a coupling mechanism, which includes a coupling receiver which, following a loading position of the rear roof part, unblocks its pivot path to the open position. The coupling receiver is expediently associated with the rear roof part such that the pivot movement of the rear roof part can be guided with simple means and by a simple and stable structure. In this connection, it is particularly expedient if the coupling opening forms a sliding guide structure extending with respect to the stationary pivot axis in the longitudinal direction of the rear roof part, so that the movement of the rear roof part during the change over between the loading position and the open position can be utilized for the uncoupling.

The operating mechanism for the rear roof part comprises a four-link operating structure as well as a linkage drive by way of which the rear roof part can be moved between the closed position and the loading position whereas the movement from the loading position to the open position occurs by way of the four-link operating mechanism.

With regard to the arrangement of the four-link operating mechanism, it has been found to be expedient if the connecting points thereof to the roof are established by means of a coupling element which preferably remains stationary during the change-over between the closed and the loading positions and forms in the loading position a strap which limits the opening angle of the roof.

In a particular embodiment according to the invention, the rear roof part of a vehicle roof that can be opened may be arranged in the open position in such a way that it forms the front end wall of the loading space just behind the vehicle seats. Then, in the open position of the rear roof part, the loading space is upwardly open and unlimited and, at occasion, usable even over the top of the passenger compartment of the vehicle.

Particularly with regard to the multi-functional configuration possibilities, it is expedient if not only the rear roof part, but also the front roof part can be opened that is if the front roof part can be moved longitudinally over the rear roof part. In this way, the front roof part can be moved into different opening positions independently of the rear roof part for example into an upwardly tilted vent position or, like a sliding roof over the rear roof part in order to provide for a configuration in which the passenger compartment is open.

It is particularly advantageous in this connection if the front roof part is insertable into the rear roof part so that the front roof part and the rear roof part form a construction unit which can be further moved in unison whereby, with the rear roof part in the open position, the whole roof of the vehicle is open.

With respect to the open position of the roof in which the rear roof part and possibly the front roof part contained in the rear roof part are lowered into the vehicle interior, it is expedient if the rear roof part is in its closed position disposed about above the rear vehicle axle. Then the whole vehicle with is available for receiving the rear roof part in its open position and also the full interior height is available so that the possibilities for accommodating the roof are increased. For example, the vehicle interior can be further opened beyond the roof opening by lowering also, the top frame member of the rear window. The top frame member of the rear window can be part of a door which is pivotally mounted at one side thereof, it can be a flap which is pivotable about a pivot axis disposed near the vehicle floor or a hatch which can be pivoted upwardly.

Further details and features of the invention will become more readily apparent from the following descriptions of schematically shown embodiment with reference to the accompanying drawings.

BRIEF DESCRIPTION OF THE DRAWINGS

FIGS. 4 to 6 show the roof in various positions during its movement from the loading position as shown in FIG. 3 to the fully open position as shown in FIG. 6, and FIGS. 7 to 10 show schematically the support and operating mechanism including the four-link structure and the drive arrangement which are connected to the rear roof part, wherein

DESCRIPTION OF A PREFERRED EMBODIMENT

Figure 1:
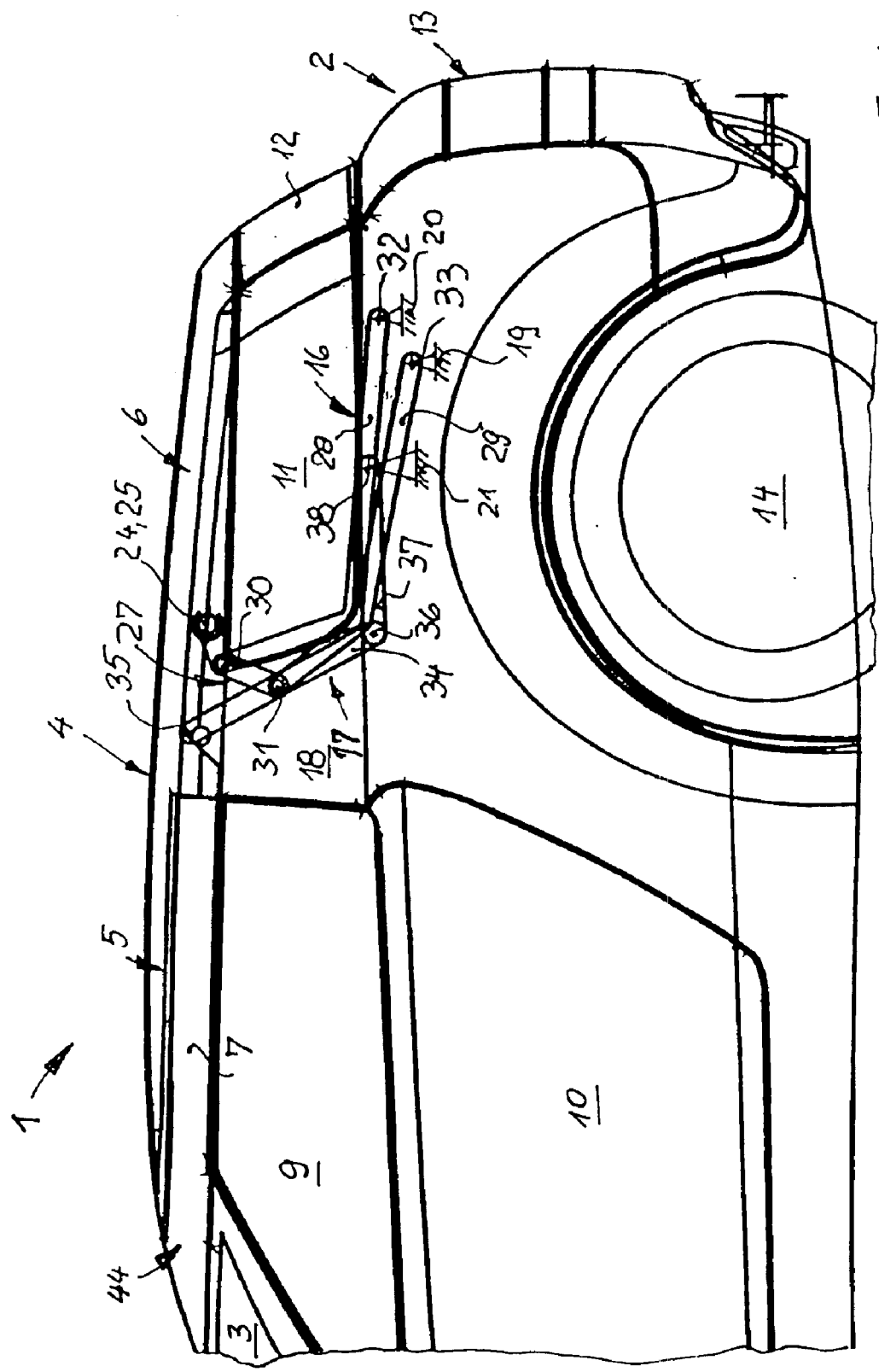
FIG. 1 shows schematically a passenger car in a side view, with the front part cut off, including a roof extending rearwardly to an upright rear end, the roof comprising a front and a rear roof part.

The steep-back vehicle 1 shown in the figures has a flat roof 4 extending from the windshield 3 to the upright or steep rear end 2 of the vehicle as it is common for passenger cars in van, station wagon, or SUV configuration. However, other than in the design solutions presently available, the roof 4 can be opened and consists of a front roof part 5 and a rear roof part 6 so that, in the embodiment shown, the roof can be opened practically over its full length. The invention considers also variants wherein only the rear roof part can be opened or an arrangement wherein an intermediate stationary (roll-over) frame member remains in the transition area between the front and rear roof parts 5, 6 when the roof is opened. The front roof part 5 may then be disposed on top of the stationary intermediate roof part or the rear roof part 6 when in its open position.

The embodiment shown in the figures includes two essentially flat roof parts 5 and 6, of which the rear roof part 6 extends backwardly to the upright rear end 2 of the vehicle and preferably over the rear closure or door.

The roof parts 5 and 6, which can be opened, are arranged preferably between body parts forming a roof frame 44 as indicated in FIGS. 1 to 6 for the front roof part 5 by the frame section 7, which, analogous to sliding arrangements, includes guide structures and, if applicable, tilting mechanisms for raising the front roof part 5 into a tilted vent position or for moving it toward and over the rear roof part 6. Preferably the front roof part 5 can be inserted into the rear roof part 6 as it is schematically shown for FIGS. 2–6.

As indicated in the embodiment showing the front roof part 5 received in the open position within the rear roof part 6, the width of the rear roof part exceeds that of the front roof part 5. In the closed position the rear roof part is disposed between the roof frame members 8, which preferably also form the top frame structure for the rear side windows 11, the windows 9 of the doors 10 and the windshield 3. A rear window 12 provided on the rear end 2 is designed so as to appear, optically, as an extension of the rear side windows 11. The rear window is preferably part of a rear door 13, which may be hinged at its side or alternatively at the top so that it can be pivoted open upwardly to the rear. For reducing the rearward extension, such a hatch door may also be supported by support links by which the flap door is moved with its lower end toward the rear wheels 14 forwardly below the vehicle floor. This however is not shown in the figures nor is it shown that the rear window 12 may include a rear transverse frame member on which the preferably frame-less rear window 12 abuts when it is closed. As shown, the roof 4 comprises two flat roof parts 5 and 6, which are movable relative to the vehicle body and of which the rear part 6 forms the transverse frame member for the rear window 12 open. The interior vehicle is open from the windshield 3 all the way to the rear door 3, delimited on the sides by the roof frame member 7 and 8.

For moving the rear roof part 6, a drive mechanism 15 is provided which includes an operating linkage 16 and operating levers 17. The drive mechanism 15 is symmetrical with respect to the longitudinal center plane of the vehicle 1 and is arranged along the sides of the vehicle body particularly in the area above the rear vehicle wheels 14. It extends particularly in the area between the side door windows 9 and the side windows 11 covered by the vehicle body 18 from the lower vehicle body pivotal support joints upwardly to the rear roof part 6. The pivot joints of the operating arms 29, 28 and of the guide arm 37 of the drive mechanism 15 are stationary support joints on the vehicle body and are indicated by the reference numerals 19 to 21.

Figure 2:
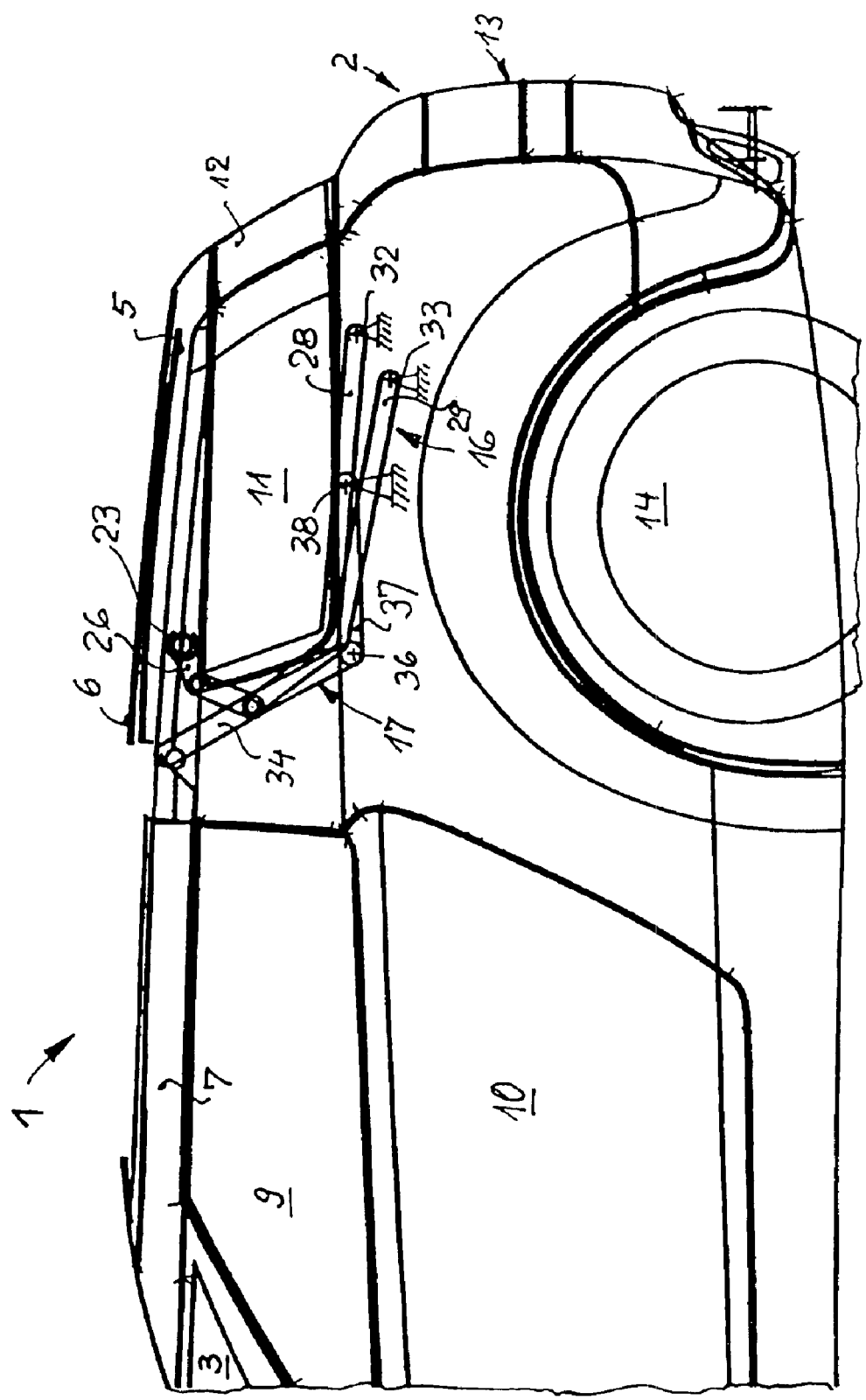
FIG. 2 is a representation corresponding to that of FIG. 1 wherein the front part of the roof is open and disposed on top of the rear roof part.
Figure 3:
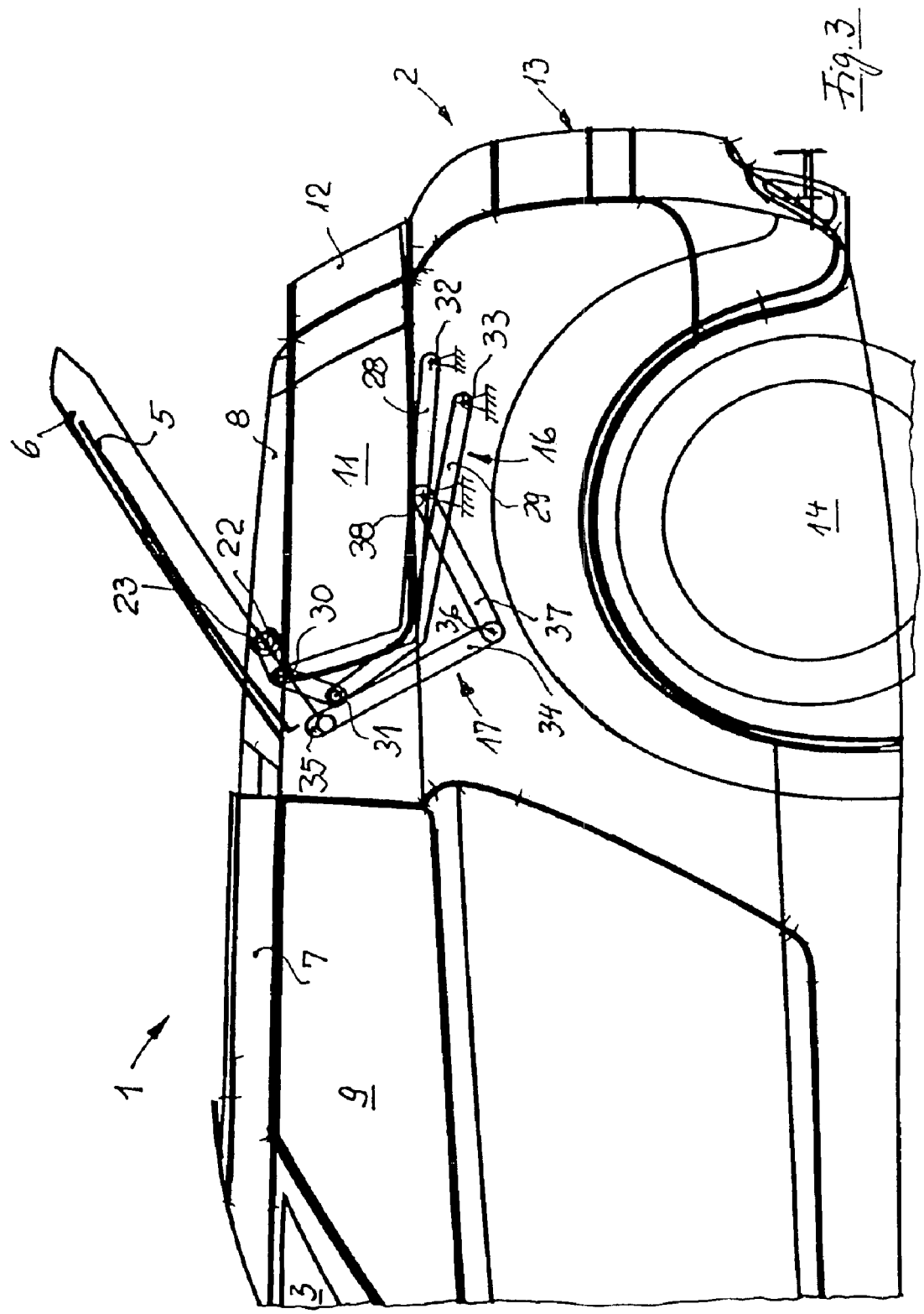
FIG. 3 is another representation corresponding to FIG. 1, wherein the roof is shown in a loading position in which the front roof is inserted into the rear roof part as shown in FIG. 2, and then tilted upwardly.
Figure 4:
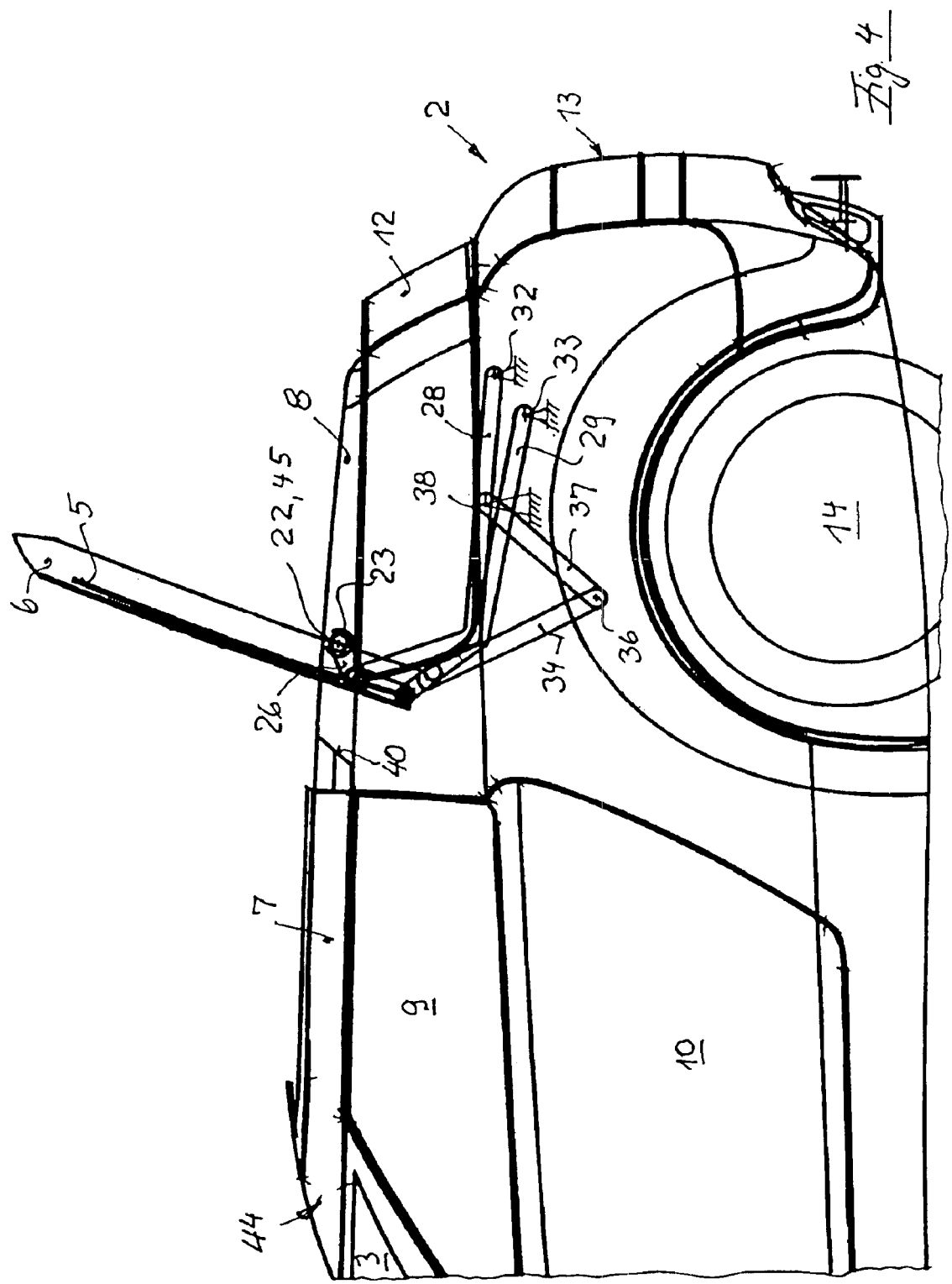
Figure 5:
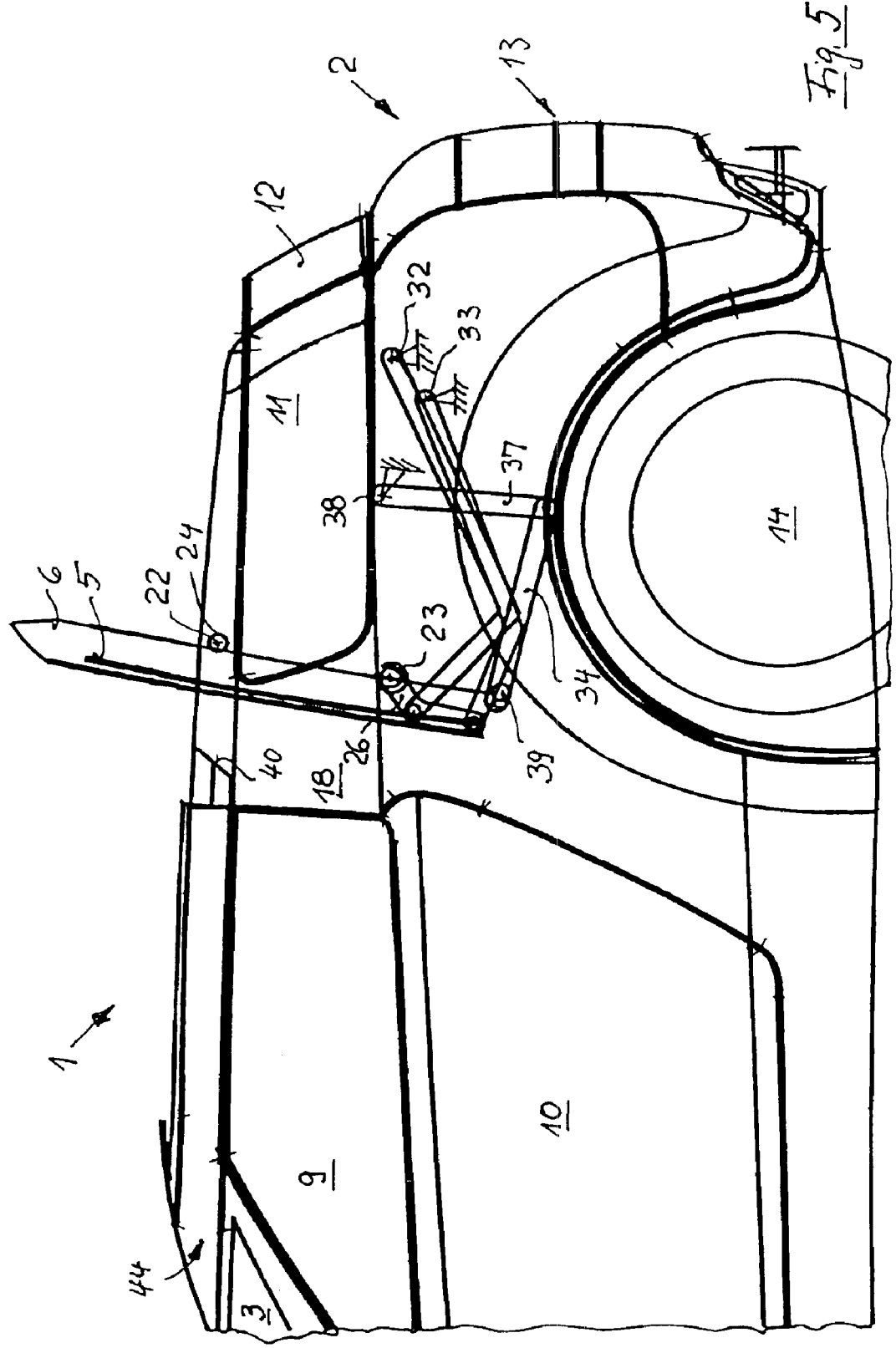
Figure 6:
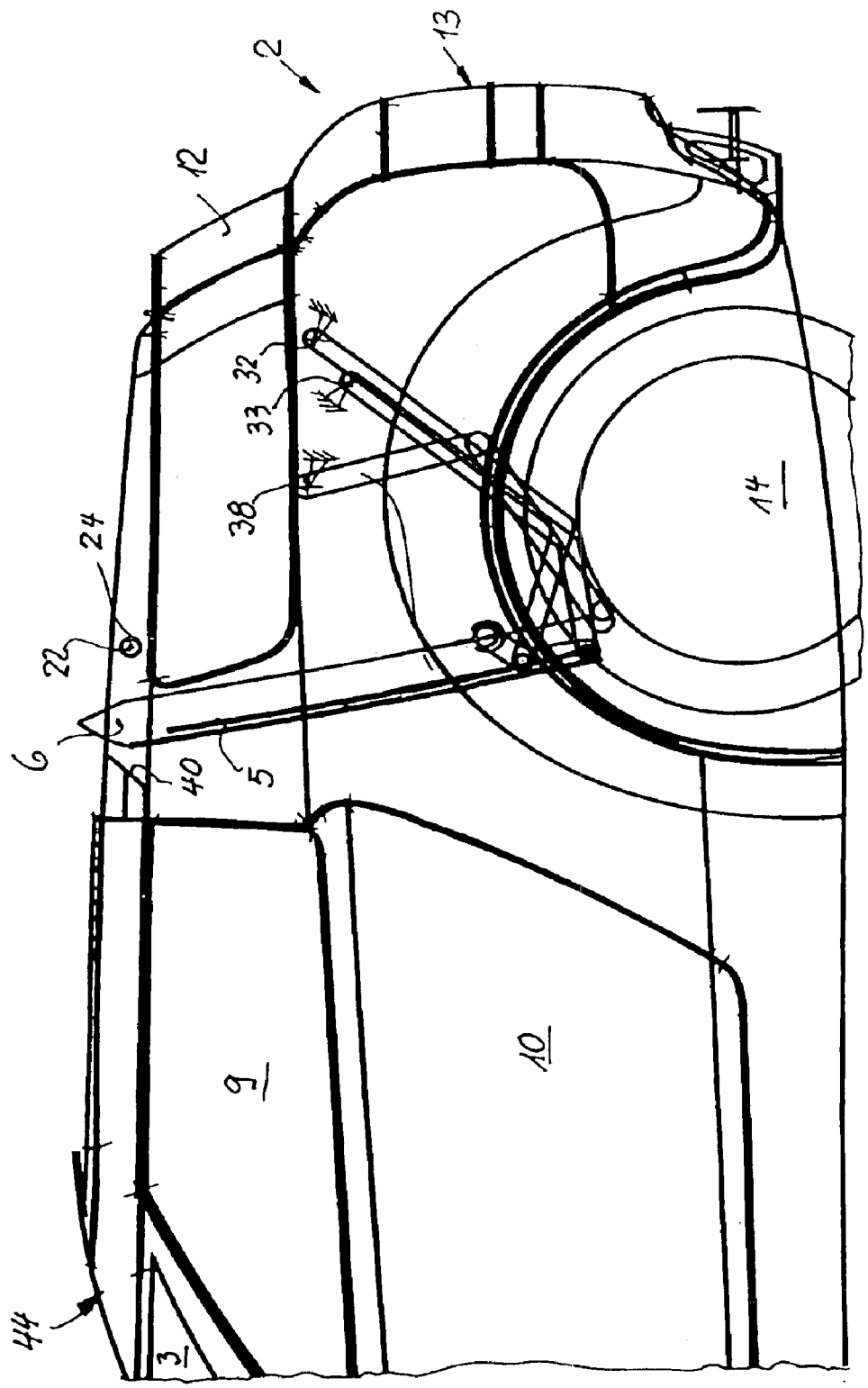

In the representation, it is assumed that the front roof part 5 is inserted into the rear roof part 6 before the rear roof part 6 is moved from the closed position as shown in FIGS. 1 and 2 into the loading position as shown in FIG. 3 or into a subsequent open position as shown in FIGS. 4–6. However, it is within the scope of the invention that the rear roof part 6 can be pivoted independently of the front roof part 5 that is for example while the front roof part remains in its closed position as shown in FIG. 1.

For the transfer of the rear roof part 6, the figures show an arrangement, wherein the rear roof part is transferred from its level, almost horizontal, closed position to an upright open position (FIG. 6, in which the rear roof part 6 is displaced from the rear door 13 of the vehicle, that is, it is disposed in the area, or in front of, the rear wheels 14 and, in this way, delimits the loading area toward the vehicle seats which are not shown. As a result, the rear roof part 6 may take on, in its open position, the function of a wind protector which eliminates undesirable draft for the persons sitting in front when the rear roof part 5 is open and also the function of a delimitation for the interior space of the vehicle which is made usable as loading space possibly after removal of the seats which may normally be arranged in this part of the vehicle.

The rear roof part 6 may also be transferred from the closed position to the open position wherein the rear roof part 6 is lowered to a position adjacent the rear end door 13 of the vehicle, which however is not shown in the drawings. In this open position of the rear roof part 6, the vehicle can be used with the roof open with additional seats in the rear. Also, this arrangement can be provided for by a drive mechanism of a design basically corresponding to the drive mechanism 15, oriented however in the opposite longitudinal direction. In this case, in the open position, the drive mechanism is expediently uncoupled from the rear roof part and the rear roof part is locked against the rear end 13 of the vehicle.

In the examples shown, particularly in accordance with FIG. 3, the rear roof part 6 is first pivoted open into a loading position in which the rear end of the rear roof part 6 is tilted upwardly. The rear roof part 6 is pivoted into the loading position as shown in FIG. 3 about a stationary support shaft 22 which is preferably disposed in the front area of the closed rear roof part 6 and extends transverse to the longitudinal vehicle direction. The support shaft is preferably stationary with respect to the vehicle body 18, particularly with respect to the top frame member 44. The rear roof part 6 is supported on, and guided by the support pin 24 with which it is engaged by way of a receiver 23 until it is lowered to the fully open position. The pivot movement from the closed position as shown in FIG. 1 to the loading position as shown in FIG. 3 is achieved by way of the operating lever 17, which is power-actuated. In the loading position, the rear roof part 6 is only slightly displaced from the roof plane but the access to the loading area is substantially improved particularly if the rear roof part 6 forms at its rear transverse frame member the top engagement structure for the rear door 13, or, respectively, the rear window 12. Then a free passage is provided from the floor of the vehicle 1 up to the upwardly tilted rear roof part 6, which facilitates accessing also objects far back in the loading space.

A further utilization for loading purposes is obtained when the rear roof part is lowered into the vehicle interior since the roof is then open over the full length of the rear roof part 6 and then also the adjacent vehicle space can be utilized as loading space. Also, objects can be loaded from the top. In this way, further possibilities are provided if the rear door 13 can be pivoted downwardly so that an extended floor area is formed.

The rear roof part 6 can be pivoted by the operating levers 17 in an opening direction about the stationary support pin 24 until it extends almost vertically as shown in FIGS. 4 and 5 and the receiver 23 can be disengaged from the stationary support pin 24 and linearly moved downwardly away from the support pin 24 so that the rear roof part 6 is no longer guided by the support pin 24. The rear roof part 6 is then further displaced by the four-link operating mechanism 16. The end position of the rear roof part 6 driven by the operating linkage 16, that is, the fully open position, is shown in FIG. 6. FIG. 5 shows an intermediate position.

Below the drive mechanism 15 will be described in detail on the basis of a simplified enlarged representation as presented in FIGS. 7 to 9, wherein for the parts already mentioned, the same reference numerals are used as earlier.

Figure 7:
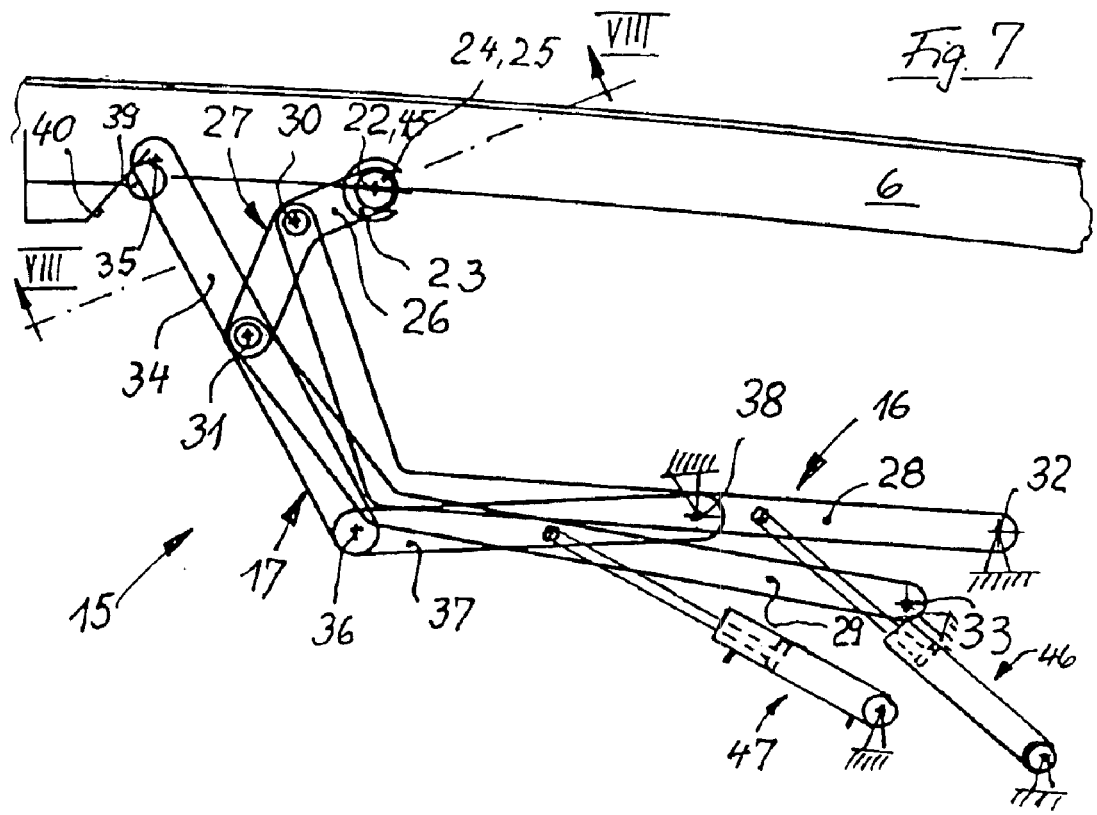
FIG. 7 shows the mechanism in the closed position of the rear roof part.
Figure 8:
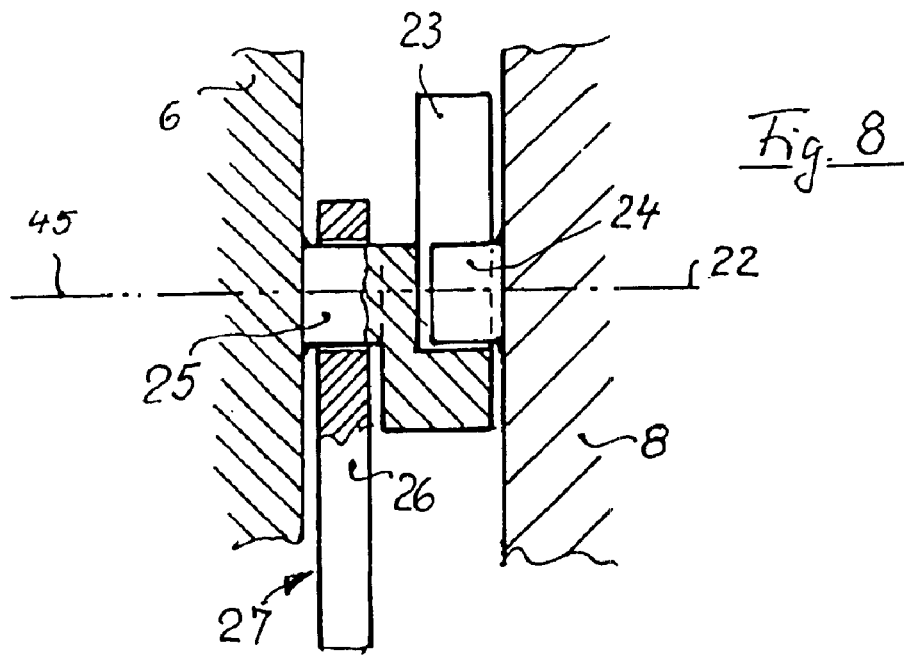
FIG. 8 is a cross-sectional view taken along line VIII—VIII of FIG. 7.
Figure 9:
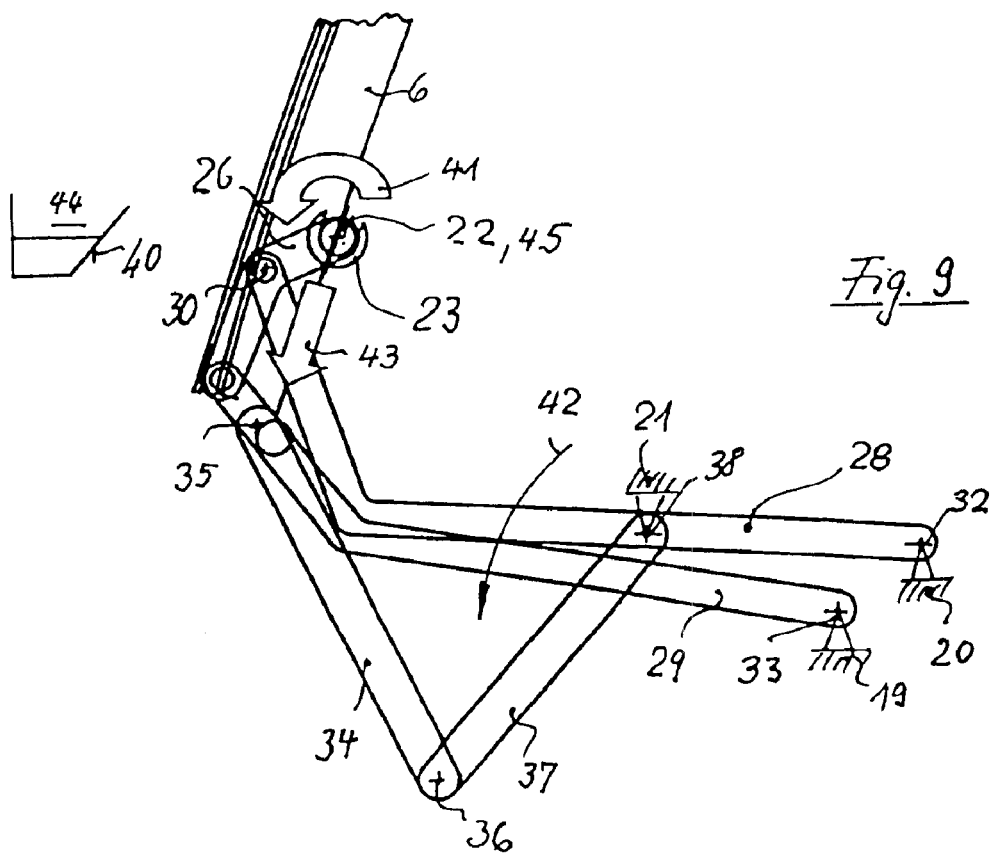
FIG. 9 shows the mechanism for the rear roof part being in the loading position and FIG. 10 shows the mechanism in the rear roof part out of its way to the storage position.

FIG. 7 shows the rear roof part 6 in its closed position wherein, as shown in the sectional enlarged view of FIG. 8 in a schematic way: The coupling receiver 23, which is firmly connected to the rear roof part 6 is in engagement with the support pin 24, which defines the pivot axis 22 and is mounted to the roof frame member 8. In the closed position of the rear roof part 6, the support pin 24 is co-axial with a bearing pin 25, which is firmly connected to the rear roof part 6 and defines a pivot axis 45. The bearing pin 25 forms a pivot bearing for one end 26 of a coupling lever 27, which is part of the operating linkage 16 and is pivotally connected to the operating arms 28 and 29 at the connecting joints 30 and 31. The operating arms 28 and 29 are connected at their opposite ends to the vehicle body 18 by the pivot joints 32 and 33. With the pivot joints 32, 33 at the vehicle body 18, the operating linkage 16 is a four-link operating mechanism. In the embodiment shown, the vehicle body support joints 32 and 33 are disposed toward the rear end 2 of the vehicle and spaced below the rear roof part 6 when it is in a closed position. The coupling lever 27 is connected by way of the bearing pin 25 to the rear roof part 6 near the front end thereof. The coupling lever 27 extends in the closed position of the rear roof part 6 between the pivot joints 30 and 31 in a direction, which is about the same as the connecting line between the pivot joints 32 and 33. The straight line extending between the connecting points 32 and 33 is inclined upwardly to the rear at an angle of about 40° which corresponds about to the opening angle of the rear roof part in its loading position (see FIG. 3).

The end 26 of the coupling lever 27 is angled with respect to a line extending between the connecting points 30 and 31 backwardly toward the rear end 2 of the vehicle so that the coupling lever 27 has the shape of a boomerang with an opening angle of about 135°. With regard to the longitudinal extension of the rear roof part 6 the connecting points 30 and 31 and respectively, 32, 33 of the operating arms on about equal average distance is provided.

The operating lever 17 extends forwardly beyond the bearing pin 25 and the pivot axis 45 of the coupling lever 27 defined thereby and is connected with its arm 34 at the pivot joint 35 to the rear roof part 6, which pivot joint is close to the front end of the rear roof part 6. At its other end, the link 34 is connected by a pivot joint 36 to the guide arm 37 of the operating lever arrangement 17 which guide arm 37 is pivotally connected to the vehicle body 18 by a pivot joint 38. The arms 34 and 37 have about the same length arid the pivot joint 38 of the guide arm 37 is disposed about in the center area between the connecting joints 32 and 33 of the operating arms 28 and 29 to the vehicle body 18. The pivot joint 38 is disposed about at the same level as the pivotal connecting point 32 of the operating arm 28. The level displacement of the connecting points 32 and 33 of the operating arms 28 and 29 corresponds about to the level displacement of the connecting points 30 and 31. In the closed position of the rear roof part 6, the operating arms 28 and 29 extend from their connecting points 32 and 33 first over part of their length in the longitudinal vehicle direction and are then angled upwardly at an obtuse angle of about 120 to 150° which is greater for the operating arm 29 than it is for the operating arm 28. The arms 34 and 37 are disposed in the closed position of the rear roof part 6 also at an angle of about the same size. For the arm 34, which is connected to the rear roof part 6 at the pivot joint 35 a stop 39 is provided which, in the shown closed position of the rear roof part 6, abuts an inclined engagement surface 40 so that, upon biasing the roof part 6 by way of the operating levers 17 into the closed position, the stop 39 engages the engagement surface 40 whereby the coupling receiver 23 is firmly held in engagement with the support pin 24, whereby also the longitudinal position of the rear roof part 6 is secured.

Figure 10:
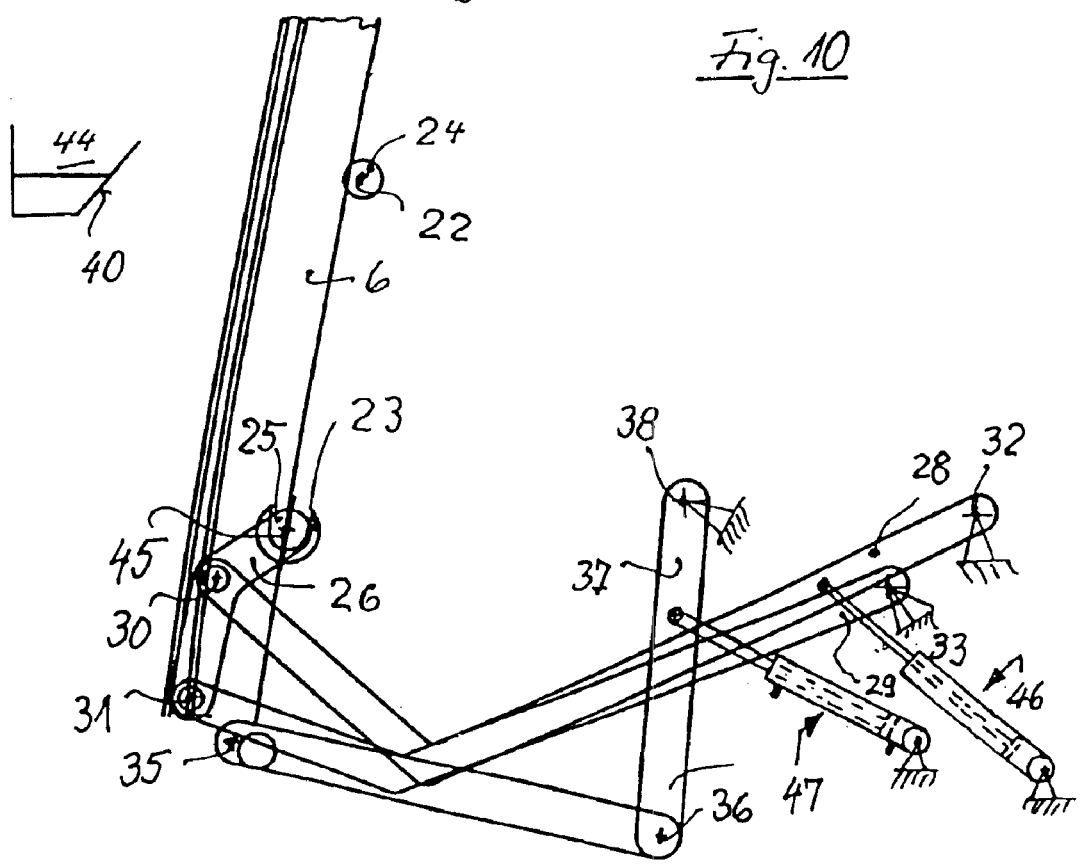

Upon transferring the rear roof part 6 into the open position as shown in FIG. 6, the roof part 6 is first pivoted about the support pin 24, which determines the pivot axis 22 that is stationary relative to the roof frame member 44 since the roof part 6 is held with its receiver 23 in engagement with the pin 24 as the operating linkage 16 is biased toward this engagement position. This can be achieved for example by means of a gas spring 46 as shown in FIGS. 7 and 10, wherein the gas compression spring 46 is shown supported on the vehicle body 18 and engaging the operating arm 28 and biasing it toward the root part 6. In accordance therewith the rear roof part 6 can be pivoted by way of the operating levers 17 in opening direction as indicated by the arrow 41 in FIG. 9 when applying a tensioning load on the operating levers 17. As shown in FIG. 9, the pivot path is limited to the point where the rear roof part 6 reaches the coupling lever 27 or a stop provided thereon. The position of the stop corresponds to a position of the rear vehicle roof 6 and an arrangement and a position of the operating linkage 16 such that pivoting of the operating linkage 16 in the direction of the arrow 42 results in an essentially linear further displacement of the roof part 6 in the direction of the arrow 43. Then, as a result, the receiver 23, which is firmly connected to the roof part 6, moves radially out of engagement with the support pin 24 so that the roof is no longer pivotally joined to the vehicle body. Then the roof part 6 moves along a path determined by the operating levers 17 and the operating linkage 16. This path is defined on one hand by the roof pivot joint 35 of the operating levers 17 and, on the other hand, by the pivot joint of the coupling lever 27 on the roof part 6 via the bearing pin 25 with the pivot axis 45.

For the operation of the operating levers and the roof part 6, a hydraulic drive is provided as is shown in FIG. 7 and FIG. 10 in an exemplary manner by a hydraulic operating cylinder 47. This is a simple arrangement with the operating cylinder 47 being connected between the vehicle body and the guide arm 37 of the operating levers 17. Also, the drive device for the drive mechanism 15 is very simple since it includes only an active and a passive drive element, that is, the operating cylinder 47 and a gas compression spring 46. Also another spring element may be provided and in place of the hydraulic operating cylinder 47 a spindle drive or similar may be provided.

The transfer of the roof part 6 from an open position as shown in FIG. 6 to a closed position as shown in FIGS. 2 or 7 occurs in the opposite way: after engagement of the receiver 23 with the support pin 24 the roof part 6 is again pivoted about the stationary pivot axis 22 and, upon reaching the closed position, is clamped by way of the stop 39 into the closed position while the receiver 23 is firmly engaged with the support pin 24.

In principle, the arrangement according to the invention can easily be adapted to various design conditions, particularly different spatial conditions can be accommodated. Particularly the operating linkage may be adapted to a deposition of the rear roof part in open position adjacent the rear door. With such an arrangement, the roof part 6 may be coupled with the rear end of the vehicle (rear door) such that it can be removed together with the rear door to provide unrestricted access to the loading area of the vehicle.

What is claimed is:

1. An enclosed motor vehicle having a vehicle body with an upright rear end (2) and a roof (4) extending over a vehicle interior (2) said rear end (2) having a loading opening and said roof (4) having a roof opening extending longitudinally forward from said upright rear end (2), and a movable cover (5, 6) for closing said roof opening and extending at least over a rear loading space of said motor vehicle, said movable roof cover (5, 6) including at least a rear roof part (6) having one end supported pivotally by pivotal support means (24) on said vehicle body (18) for permitting tilting of said rear roof part (6) upwardly into an inclined position so as to facilitate loading of said loading space and a drive mechanism (15) pivotally connected to said rear roof part (6) and further including releasable coupling means (23–26) permitting uncoupling of said rear roof part (6) from said pivotal support means for transferring said rear roof part (6) into an upright position in the interior of said motor vehicle.

2. The enclosed motor vehicle according to claim 1, wherein said coupling moans (23–26) include a receiver (23) connected to one of said rear roof part (6) and said vehicle body (18), and a support pin (24) mounted to the other of said rear roof part (6) and said vehicle body (18) and said rear roof part (6) for engagement by said receiver (23) and forming a pivotal support means (23–26) pivotally supporting said rear roof part (6) on a vehicle body-stationery pivot axis (22) but permitting disengagement of said receiver (23) and said support pin (24) when said rear roof part (6) is in a predetermined angular position.

3. The enclosed motor vehicle according to claim 2, wherein said receiver (23) includes a guide slot (23) so as to be slidably engaged by said support pin (24).

4. The enclosed motor vehicle according to claim 2, wherein said drive mechanism (15) comprises a four-link operating linkage (16) and operating levers (17) for actuating said rear roof part (6).

5. The enclosed motor vehicle according to claim 4, wherein said four-link operating linkage (16) includes two operating arms (28, 29) pivotally supported with one end thereof on said vehicle body at spaced support points (32, 33) and being pivotally connected at their opposite ends to a coupling lever (27), which is pivotally connected to said rear roof part (6).

6. The enclosed motor vehicle according to claim 5, wherein said coupling means of said fourlink operating linkage (16) is, in the closed position of said rear, vehicle roof part (6), arranged co-axially with the pivotal support means (23–26) for said rear vehicle roof part (6).

7. The enclosed motor vehicle according to claim 5, wherein said coupling lever includes a lever end (26) projecting from first and second operating arms (29, 28) toward said rear roof part (6) and is pivotally connected thereto at said coupling means.

8. The enclosed motor vehicle according to claim 7, wherein said operating levers (17) comprise two arms (34, 37) which are pivotally interconnected and one (37) of said two arms (34, 37) is pivotally supported on said vehicle body whereas the other (34) is pivotally connected to said rear roof part (6) at a pivot joint (35), which is disposed in spaced relationship from said rear roof part pivotal support means (23–26).

9. The enclosed motor vehicle according to claim 8, wherein said coupling lever (27) has a length corresponding to the distance between said roof part pivot joint (35) of said other arm (34) and said rear roof part pivot axis (45) and said lever end (26) is angled backwardly toward said rear roof part pivot axis (45) when the rear roof part is closed.

10. The enclosed motor vehicle according to claim 9, wherein said coupling lever end (26) is so angled backwardly that, in the tilted loading position of said rear roof part (6) the angled lever end (26) extends about in the same direction as the rear roof part (26).

11. The enclosed motor vehicle according to claim 9, wherein a Section of said coupling lever (27) dispersed between the connecting points (30, 31) thereof to the first and second operating arms (28, 29) extends in an open position of said rear roof part (6) in the longitudinal direction of said rear roof part (6).

12. The enclosed motor vehicle according to claim 7, wherein said lever end (26) of said coupling lever (27) is pivotally connected to said rear roof part (6) at said coupling means, said lever end (26) remaining connected to said rear roof part (6) at said coupling means during transfer of said rear roof part (6) into a fully open position at which point said rear roof part (6) is disengaged from said pivotal support means on said vehicle.

13. The enclosed motor vehicle according to claim 12, wherein said coupling lever (27) forms a stop for said rear roof part (6) in the loading position thereof and for the remainder of its movement to and from the fully open position of the rear roof part (6).

14. The enclosed motor vehicle according to claim 5, wherein a line defined by said spaced support points (32, 33) extends about parallel to a line defined by connecting points (30, 31) of opposite ends of the operating arms (28, 29) to said coupling lever (27).

15. The enclosed motor vehicle according to claim 14, wherein an operating device (47) is connected between said vehicle body and one of said operating levers (17) for pivoting said rear roof part (6) between closed and loading positions, said operating linkage (16) including said operating arms (28, 29) remaining stationary during movement of said rear roof part (6) between the closed and the loading position thereof.

16. The enclosed motor vehicle according to claim 1, wherein, in an open position of said rear roof part (6), in the interior of the vehicle, said rear roof part (6) is disposed in spaced relationship from the rear end (13) of the vehicle and forms a limit structure for the rear loading area of the vehicle.

17. The enclosed motor vehicle according to claim 1, wherein, in an open position, said rear roof part (6) is disposed in the vehicle interior in an upright position.

18. The enclosed motor vehicle according to claim 1, wherein said vehicle roof (4) includes a front roof part (5) which is movable in the longitudinal direction of the vehicle below the rear roof part (6).

19. The enclosed motor vehicle according to claim 1, wherein said front roof part (5) is insertable into said rear roof part (6).

* * * * *